April 18, 1967 D. R. ACUFF ETAL 3,314,127
METHOD OF MAKING UNIVERSAL BEARINGS
Filed Sept. 6, 1963 2 Sheets-Sheet 1

INVENTORS
DONALD ROBERT ACUFF
ALBERT CHARLES HUNTER
BY
Meyer, Baldwin, Doran & Egan
ATTORNEYS INVENTORS
DONALD ROBERT ACUFF
ALBERT CHARLES HUNTER
BY
Meyer, Baldwin, Doran & Egan
ATTORNEYS

United States Patent Office 3,314,127
Patented Apr. 18, 1967

3,314,127
METHOD OF MAKING UNIVERSAL BEARINGS
Donald Robert Acuff, Cleveland Heights, and Albert Charles Hunter, Mentor, Ohio, assignors to Towmotor Corporation, Cleveland, Ohio, a corporation of Ohio
Filed Sept. 6, 1963, Ser. No. 307,071
2 Claims. (Cl. 29—149.5)

This invention relates to a novel and improved method of making a universal or self-aligning bearing of the type which employs a spherical body encased within a one-piece race or socket member that is cast or similarly disposed around said spherical body, said race member connectable to a first work transmitting element and said spherical body being conectable to a second work transmitting element so as to provide universal relative movement therebetween.

A primary object of the present invention is to provide a new and novel method of making a universal bearing which is characterized by having a one-piece spherical body encaptured within a one-piece socket member in such manner as to provide relative movement therebetween.

Another object of the present invention is the provision of a new and improved method of making a universal bearing as is defined in the last preceding object, and wherein the spherical body is formed of a material having a higher melting temperature than the socket member to enable said socket member to be cast around to afford relative movement therebetween.

Still another object of the present invention is to provide a method of making a universal bearing especially designed for use as a rod end bearing which is characterized by having a spherical body encased within a one-piece socket member, said body being connectable to a first work transmitting element and the socket member being connectable to a second work transmitting element.

Another object of the present invention is to provide a novel and improved method for the manufacture of a universal bearing of the type which employs a spherical body encased within a one-piece race or socket member in such manner as to afford relative movement therebetween.

Additional objects and advantages of the universal bearing and to the method of manufacture of said bearing of the present invention will be aparent to one skilled in the art to which they pertain and upon reference to a preferred embodiment thereof as illustrated in the accompanying drawings, wherein.

With reference directed to the drawings, the universal bearing of the present invention is herein shown as incorporated into a tie rod assembly as merely one exemplification of its utility, the tie rod assembly being especially designed for use in the steering mechanism of a wheeled vehicle such as for example a lift truck or like material handling apparatus.

Figure 1:
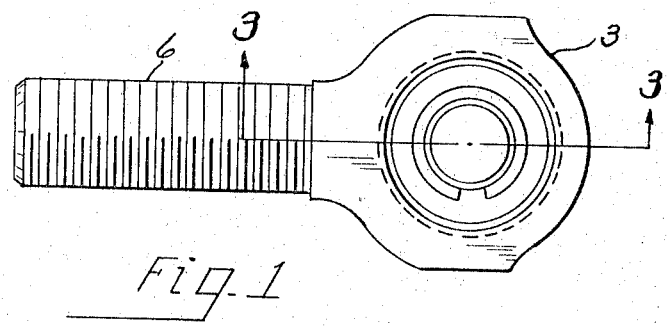
FIG. 1 is a plan view of a bearing assembly embodying the universal bearing of the present invention.
Figure 2:
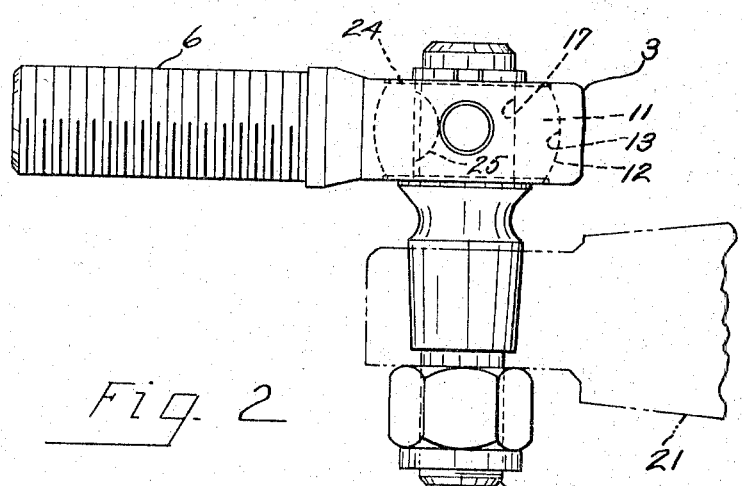
FIG. 2 is a view in elevation of the assembly of FIG. 1.

As best seen in FIG. 2, the present embodiment of universal bearing is seen to include a socket member 3 constructed preferably of a metallic material such as aluminum and which is generally torus shaped in configuration being integrally formed with a tie rod 6 extending outwardly therefrom in a direction generally perpendicular to its axis. Although not herein shown, the tie rod 6 is intended to be connected by any suitable means to a first element of the steering mechanism of the vehicle wherein relative movement is desired between the latter and a second element of the vehicle.

The bearing assembly also includes a spherical shaped body or ball 11 which is disposed within the central opening 12 of the socket member 3, said body being preferably constructed of a suitable metallic material such as steel.

Figure 3:
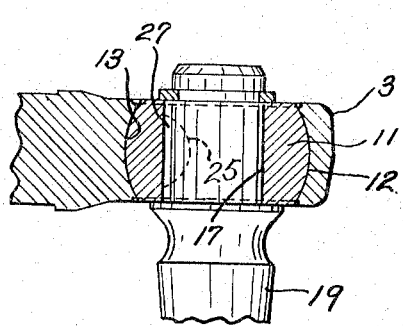
FIG. 3 is a fragmentary elevational view shown partly in section to more clearly illustrate the otherwise hidden construction thereof.

As seen in FIG. 3, the central opening 12 is generally circular about its center, whereby its side wall 13 is concave in configuration and of such dimension and axial depth as to closely overlie the periphery of the body 11 so as to capture the latter in said socket member. Said side wall 13 in the instant embodiment is seen to overlie approximately 65° of the surface of the body 11.

Figure 4:
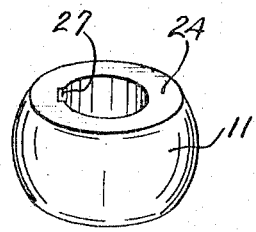
FIG. 4 is a perspective view of the spherical body incorporated into the universal bearing of the present invention.

The body 11, as seen in FIGS. 2 and 4, is formed with an axial bore 17 which is intended to accommodate one end of a stud 9, said stud connecting, in turn, to one end of a second element 21 of the vehicle steering mechanism. The body 11 is likewise provided with opposed flats 24 surrounding the opposite ends of the bore 17 and which enable the stud 19 to be properly aligned therewith. To complete the bearing assembly a suitable retaining key 25 is inserted into corresponding keyways 27 formed in the bore 17 and stud 19 to anchor the latter to said body.

With this bearing assembly, universal movement is permissible between the elements of the steering mechanism of the vehicle connected to said tie rod 6 and stud 19 without resultant misalignment and/or chattering of said elements.

As is aforementioned, the spherical body 11 is disposed and captured within the aforesaid opening of the socket member 3 so as to be universally moveable therein, and this is accomplished by the novel method as will now be described.

The body 11 is first fabricated to its desired shape such as the spherical configuration shown therefor in FIG. 4 and, as above mentioned, the body is formed of a material which has a higher melting temperature than the material from which the socket member 3 is to be made. For example, in one preferred bearing assembly, the socket member 3 is formed of aluminum material and the body 11 formed of a hardened steel material. However, as will also be hereinafter realized any two materials which have different melting temperatures may be used, the material of higher melting temperature being used for the spherical body, and the material of relatively lower melting temperature for the socket member.

The body 11 is next cleaned of any foreign material and coated with a liquid colloidal solution of powdered graphite and a suitable liquid such as oil, water or alcohol. The powdered graphite may be a commercial grade, such as for example one of the several grades commercially identified by the Speer Carbon Company, of St. Marys, Pa., as grades 5473; 3499S; 872V, which have a maximum particle size in the range between .005 and .032 inch.

The oil vehicle may be any suitable commercial grade such as the grade commonly referred to as 20 wt. and the alcohol may likewise be of a type readily commercially available.

The resulting solution may be sprayed onto the body 11 or the latter may be dipped therein to provide a coating to the exterior surface of the same. As will be hereinafter apparent, the thickness of the coating applied to the surface of the body will control the degree of looseness or clearance between the body 11 and socket member 3. As will be also hereinafter apparent, the thickness of the coating will depend to a great extent upon the quantity of graphite used in the solution.

With one of the above mentioned graphite powders and a commercial grade of 20 wt. oil of the ratio of one level cup of graphite to two quarts of oil mixed to a consistency of syrup, a clearance of approximately .0003 inch has been obtainable when using a steel body and an aluminum socket member of the configuration herein shown.

Figure 5:
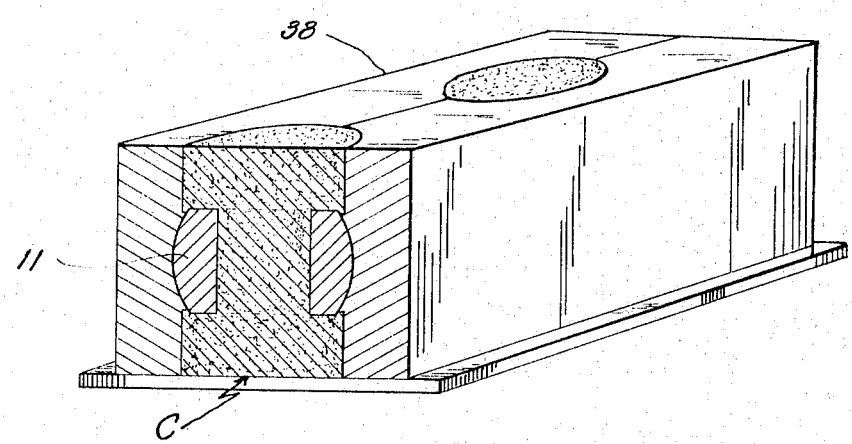
FIGURE 5 is a fragmentary elevational view partly in section to illustrate a suitable core box.
Figure 6:
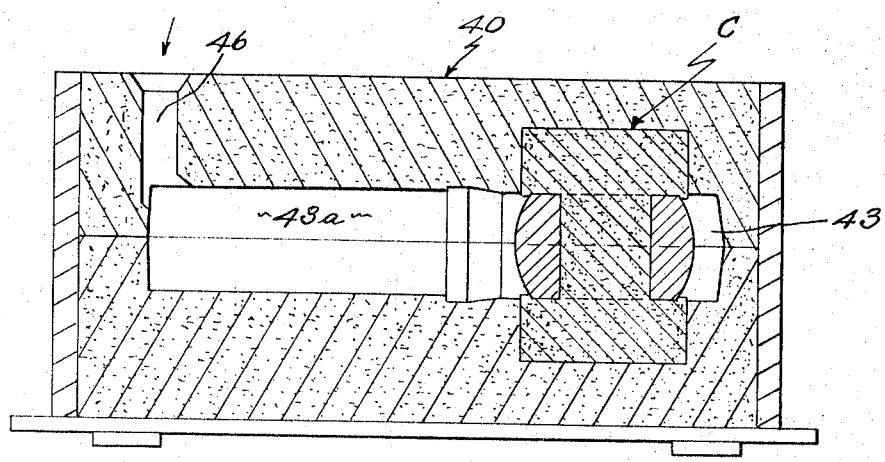
FIG. 6 is a cross-sectional view of a suitable mold assembly.

The coated body 11 may then be disposed within a suitable core box 38 as shown in FIG. 5 to thus form a mold core C in a conventional manner, which is then placed within a suitable conventional mold as identified in its entirety at 40 in FIG. 6, said core being disposed within a cavity 43 which is preformed to the configuration desired for the socket member 3.

The cavity 43 is likewise seen to include a portion 43a which partakes of the configuration of the integral tie rod 6, said cavity portion communicating with a pour hole 46 as will be readily understood.

The aluminum material from which the socket member is to be formed is next converted to its molten state and then poured into the mold cavity 43 wherein it fills the same and upon cooling and solidifying, the aluminum material partakes of the desired configuration for the socket member 3 which is effective to capture the spherical body 11 therein. As will be understood, the melting temperature of aluminum is approximately 660° C. and that of steel approximately 1500° C., and consequently the steel body 11 is not affected by the introduction of molten aluminum with the mold cavity 43.

As is also well known, graphite sublimes at a temperature somewhat over 6400° F., and at temperatures below this level it is not noticeably affected. Consequently, at the melting temperature of aluminum the graphite remains in its solid state while the liquid vehicle in which it is suspended boils off and is evaporated to leave the graphite particles coating the surface of the body member 11.

As the aluminum cools and solidifies, it has a tendency to shrink and bind against the body 11. However, the graphite prevents said aluminum from adhering to or fusing with the body 11 and in this manner, a suitable clearance is maintained between the body and socket member to thereby enable each element to have relative universal movement.

It has been found that if the body 11 is preheated to just below the boiling point of the liquid vehicle, the instant process will be somewhat accelerated inasmuch as said liquid vehicle will boil off almost instantly upon introduction of the aluminum into the mold cavity.

Having thus described in detail the novel self-aligning bearing element of the present invention and the method of manufacture of said bearing element it will be apparent that the same is susceptible to various changes and modifications without departing from the inventive concepts relating thereto as are defined in the claims.

What is claimed is:

1. A method of manufacturing a self-aligning bearing comprising forming a bearing element from a solid material having a predetermined melting temperature, forming a cavity in a casting mold having a configuration of a socket member for encompassing said element, coating said bearing element with a colloidal solution of powdered graphite and a liquid vehicle, disposing the coated element in said cavity, pouring a material which has a lower melting temperature than the bearing element and graphite into said cavity in a liquid state so as to encompass said bearing element whereby the liquid vehicle in said solution boils off leaving the powdered graphite coating on said element, and enabling said liquid material to solidify to form a one-piece socket member in said mold whereby said bearing element is encaptured therein so as to have relative universal movement with respect to said socket member.

2. A method of manufacturing a self-aligning bearing comprising forming a bearing element of a solid material having a predetermined melting temperature, coating said bearing element with a colloidal solution of powdered graphite and a liquid vehicle which prevents said bearing element from fusing with a socket member and provides a clearance space determined by the thickness of the coating between said bearing element and said socket member, and then casting said socket member from a material having a relatively lower melting temperature with respect to the bearing element and graphite around the bearing element so as to encompass said element therein and allow relative movement therebetween.

References Cited by the Examiner

UNITED STATES PATENTS

| | | | |
|---|---|---|---|
| 1,175,288 | 3/1916 | Patrick | 308—29 |
| 2,995,953 | 8/1961 | De Fazi | 308—72 X |
| 3,192,607 | 7/1965 | Hilton | 29—149.5 |

JOHN F. CAMPBELL, *Primary Examiner.*

THOMAS H. EAGER, *Examiner.*